US012718002B2

(12) United States Patent
Petruk et al.

(10) Patent No.: US 12,718,002 B2
(45) Date of Patent: Aug. 25, 2026

(54) AUTOMATIC SUGGESTION OF DOMAIN-SPECIFIC KNOWLEDGE

(71) Applicant: Grammarly, Inc., San Francisco, CA (US)

(72) Inventors: Anna Petruk, Cherkasy (UA); Dru Knox, Oakland, CA (US)

(73) Assignee: Superhuman Platform Inc.

( * ) Notice: Subject to any disclaimer, the term of this patent is extended or adjusted under 35 U.S.C. 154(b) by 84 days.

(21) Appl. No.: 18/586,882

(22) Filed: Feb. 26, 2024

(65) Prior Publication Data

US 2025/0045508 A1 Feb. 6, 2025

Related U.S. Application Data

(60) Provisional application No. 63/487,106, filed on Feb. 27, 2023.

(51) Int. Cl.
*G06F 3/0481* (2022.01)
*G06F 40/134* (2020.01)
(Continued)

(52) U.S. Cl.
CPC .......... *G06F 40/134* (2020.01); *G06F 3/0481* (2013.01); *G06F 40/186* (2020.01); *G06F 40/216* (2020.01); *G06Q 10/10* (2013.01)

(58) Field of Classification Search
CPC .... G06F 40/134; G06F 40/186; G06F 40/216; G06F 3/0481; G06Q 10/10
See application file for complete search history.

(56) References Cited

U.S. PATENT DOCUMENTS 6,122,647 A * 9/2000 Horowitz .............. G06F 16/954 707/999.005
6,516,312 B1 * 2/2003 Kraft ....................... G06F 16/30 707/999.005

(Continued)

OTHER PUBLICATIONS

Zhengwei Zhao et al., Multi-modal Question Answering System Driven By Domain Knowledge Graph, Aug. 1, 2019, International Conference on Big Ddata Computing and Communications, pp. 43-47 (Year: 2019).*

(Continued)

*Primary Examiner* — Tam T Tran

(74) *Attorney, Agent, or Firm* — Van Hoven PC; Jordan Becker

(57) ABSTRACT

In one embodiment, a computer-implemented method for dynamically presenting information in digital documents comprises receiving text data; identifying in the text data a target domain-specific term based on a set of domain-specific term records, each domain-specific term record including a domain-specific term and a term description; providing an interactive element corresponding to the target domain-specific term; receiving a signal indicating a user interacting with the interactive element; accessing a target domain-specific term record from the set of domain-specific term records corresponding to the target domain-specific term, to retrieve a target term description being a term (Continued)

300

310 Receiving text data

315 Based on a set of domain-specific term records, each domain-specific term record including a domain-specific term and a term description, identifying in the text data a target domain-specific term 320 Providing an interactive element corresponding to the target domain-specific term 325 Receiving a signal indicating a user interacting with the interactive element 330 Accessing a target domain-specific term record to retrieve a target term description 335 Displaying the target term description using a domain-specific term associated knowledge card description for the target domain-specific term, in response to the signal; and displaying the target term description using a domain-specific term associated knowledge card.

19 Claims, 9 Drawing Sheets

(51) Int. Cl.

| | |
|---|---|
| ***G06F 40/186*** | (2020.01) |
| ***G06F 40/216*** | (2020.01) |
| ***G06Q 10/10*** | (2023.01) |

(56) References Cited

U.S. PATENT DOCUMENTS

| | | | |
|---|---|---|---|
| 2012/0016678 | A1 | 1/2012 | Gruber et al. |
| 2022/0222047 | A1 | 7/2022 | Todirel et al. |
| 2022/0293107 | A1 | 9/2022 | Leaman et al. |
| 2022/0309037 | A1 | 9/2022 | Gutierrez et al. |
| 2023/0135179 | A1 | 5/2023 | Mielke et al. |

OTHER PUBLICATIONS

Yan Wang et al., A Staffing Recommender Systtem based on Domain-Specific Knowledge Graph, Dec. 6, 2021, International Conference on Social Analysis—Management and Security, pp. 1-6 (Year: 2021).*

Siddhartha Paul Tiwari, "Knowledge Management Strategies and Emerging Technologies—an Overview of the Underpinning Concepts," 2022 International Journal of Innovative Technologies in Economy, (1(37), arXiv:2205.01100v1, web retrieval https://doi.org/10.48550/arXiv.2205.01100, May 3, 2022, 5 pages.

Peter Vaclavik, et al, "Automatic derivation of domain terms and concept location based on the analysis of the identifiers," Acta Univ. Sapientiae, Informatica, 2,1 (2010) 40-50, arXiv:1003.1399v1, web retrieval https://doi.org/10.48550/arXiv.1003.1399, Mar. 6, 2010, 11 pages.

Ruiqing Ding et al, "A Unified Knowledge Graph Augmentation Service for Boosting Domain-specific NLP Tasks," arXiv:2212.05251v2, web retrieval, https://doi.org/10.48550/arXiv.2212.05251, Jun. 5, 2023, 15 pages.

* cited by examiner

AUTOMATIC SUGGESTION OF DOMAIN-SPECIFIC KNOWLEDGE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022-2023 Grammarly, Inc.

BENEFIT CLAIM

This application claims the benefit under 35 U.S.C. § 119(e) of provisional application 63/487,106, filed Feb. 27, 2023, the entire contents of which are hereby incorporated by reference for all purposes as if fully set forth herein.

TECHNICAL FIELD

One technical field of the present disclosure is computer-implemented reading and text processing applications. Another technical field is enterprise knowledge management.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Groups, organizations, and enterprises commonly develop domain-specific vocabularies of terms, acronyms, industry-specific jargon, project names, or other terms that have meaning only within a particular enterprise or organization (any of which can be denoted a "term" for simplicity). When a person joins a project, group, organization, or enterprise that has a long-established, extensive, complex domain-specific vocabulary, the person can encounter delay, inefficiency, or difficulty in discovering the meaning of the term. For example, the person may have to use internet searches, emails to colleagues, phone calls, or other inefficient means to locate the meaning of terms and related resources such as documents, web pages, or people. These issues reduce the productivity of persons who are new to a project, group, organization, or enterprise. The same issues can arise for people who are not new, but unfamiliar with the relevant term or who have not used the term in a long interval.

Based on the foregoing, the referenced technical fields have developed an acute need for better ways to provide efficient, convenient means of delivering definitions and relevant resources and people based on identifying a term in a digital electronic document.

SUMMARY

The appended claims may serve as a summary of the invention.

DETAILED DESCRIPTION

General Overview

Figure 1A:
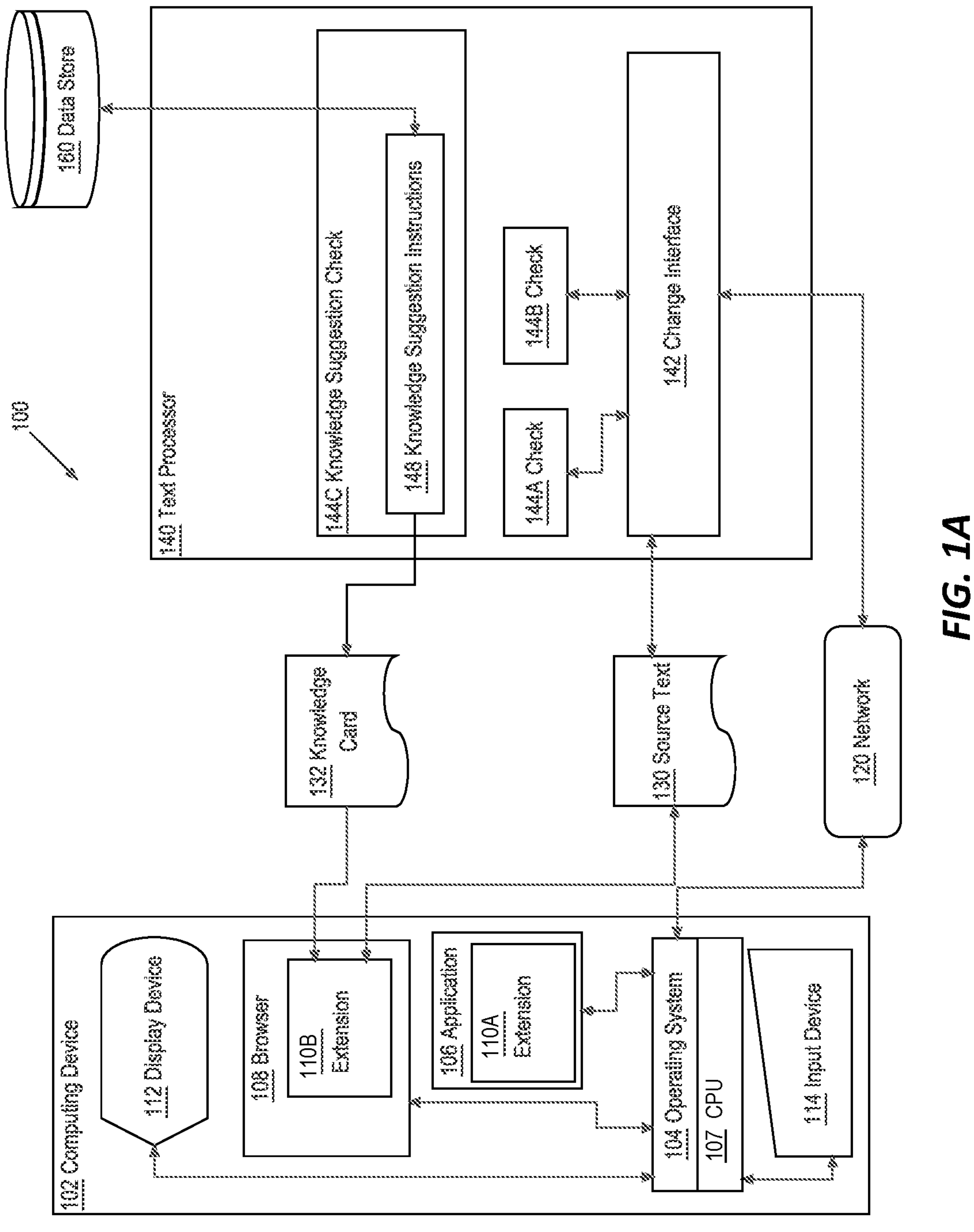
FIG. 1A is an example system for automatically suggesting domain-specific knowledge according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to more fully illustrate one or more aspects of the inventions. Similarly, although process steps, method steps, algorithms, or the like may be described in a sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of the more than one device or article.

The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

The reader is presumed to understand the disclosures of application Ser. No. 18/343,380, filed 28 Jun. 2023, and U.S. Pat. No. 11,468,227, issued 11 Oct. 2022.

Embodiments encompass the subject matter of the following numbered clauses:

1. A computer-implemented method for dynamically presenting information in digital documents, the computer-implemented method executed using a first computer and comprising receiving text data; identifying in the text data a target domain-specific term based on a set of domain-specific term records, each domain-specific term record including a domain-specific term and a term description; generating first presentation instructions which when rendered cause visually displaying at a second computer an interactive element corresponding to the target domain-specific term; receiving a signal indicating a computer interaction with the interactive element; accessing a target domain-specific term record from the set of domain-specific term records corresponding to the target domain-specific term, to retrieve a target term description comprising a term description for the target domain-specific term, in response to the signal; and generating second presentation instructions which when rendered cause visually displaying at a second computer the target term description using a domain-specific term associated knowledge card.

2. The computer-implemented method of clause 1, wherein the target domain-specific term is one of a linguistic short form, a name of a product or service, an organization, an event, a task, a domain-specific construct, or a phrase containing natural language.

3. The computer-implemented method of clause 1, wherein providing the interactive element includes generating a link for a text string within the text data corresponding to the target domain-specific term.

4. The computer-implemented method of clause 1, wherein the signal comprises event data specifying that a click on a generated link occurred.

5. The computer-implemented method of clause 4, further comprising generating the second presentation instructions which when rendered at the second computer cause displaying, using a graphical user interface (GUI) of the second computer, at least one of a list of user accounts associated with the domain-specific term, a list of links to data files associated with the domain-specific term, a list of actions that can be performed and defining a programmatic behavior of the knowledge card, or notes associated to the domain-specific term.

6. The computer-implemented method of clause 5, further comprising generating the second presentation instructions which when rendered at the second computer cause displaying in the GUI one or more controls programmed to receive input to edit at least one of a list of user accounts associated with the domain-specific term, a list of links to data files associated with the domain-specific term, a list of actions that can be performed and defining a programmatic behavior of the interface, or notes associated to the domain-specific term.

7. The computer-implemented method of clause 1, further comprising generating the first presentation instructions which when rendered at the second computer cause displaying an interface that is programmed for displaying one or more domain-specific terms associated with the text data and, in association with the one or more domain-specific terms, at least domain-specific term names; term descriptions; and statistical information, the statistical information containing at least one of a number of times the one or more domain-specific terms are used, a number of hyperlinks associated with the one or more domain-specific terms, or a number of notes associated with the one or more domain-specific terms.

8. The computer-implemented method of clause 1, wherein the target domain-specific term record further includes at least one of a list of user accounts associated with the domain-specific term, a list of links to data files associated with the domain-specific term, a list of actions that can be performed and defining a programmatic behavior of the interactive element, notes associated to the domain-specific term, a type of the target domain-specific term record, or one or more matching patterns for identifying the target domain-specific term.

9. The computer-implemented method of clause 8, wherein the type of the target domain-specific term record is one of a project, a product, a team, an event, or a process.

10. The computer-implemented method of clause 1, further comprising receiving, from the second computer, input specifying a request for accessing an administration panel interface for editing the set of domain-specific term records; generating third presentation instructions which when rendered at the second computer cause displaying an administration panel interface; receiving, via the administration panel interface, instructions from the second computer specifying changing one or more domain-specific term records of the set of domain-specific term records; and executing the instructions and updating the one or more domain-specific term records of the set of domain-specific term records.

11. The computer-implemented method of clause 1, further comprising generating third presentation instructions which when rendered at the second computer cause displaying an interface with selection controls for selecting one or more text characters within the text data; identifying a domain-specific term based on the selected characters; generating fourth presentation instructions which when rendered at the second computer cause displaying a record-entering interface with record controls to enter information for generating a domain-specific term record related to the identified domain-specific term based on the identified domain-specific term; and generating a domain-specific term record by allocating within a memory of the first computer the domain-specific term record having the information.

12. The computer-implemented method of clause 11, wherein the record-entering interface is configured to suggest at least one of a link to data related to the identified domain-specific term or one or more names of user accounts associated with the information associated with the identified domain-specific term.

13. The computer-implemented method of clause 12, wherein the text data comprises a plurality of text communication associated with a plurality of user accounts, and wherein the one or more names are selected from names of the plurality of user accounts based on a frequency of using the identified domain-specific term within the plurality of text communication associated with the plurality of user accounts.

14. The computer-implemented method of clause 1, further comprising using a text frequency analysis, identifying frequently used text patterns within the text data; based on the identified frequently used text patterns, selecting one or more frequently used text patterns; and allocating within a memory, one or more template domain-specific term records corresponding to one or more selected domain-specific terms that match the frequently used text patterns.

15. The computer-implemented method of clause 1, further comprising using a text frequency analysis, identifying frequently used text patterns within the text data; generating third presentation instructions which when rendered at the second computer cause displaying a record-entering interface having controls programmed for receiving information for generating one or more domain-specific term records related to the identified frequently used text patterns; and generating the one or more domain-specific term records by allocating within a memory of the first computer the one or more domain-specific term records having the information.

16. The computer-implemented method of clause 1, further comprising: analyzing the text data to identify a linguistic short form within the text data; generating third presentation instructions which when rendered at the second computer cause displaying a record-entering interface with controls programmed for receiving information for generating the domain-specific term record related to the identified linguistic short form based on the identified linguistic short form; and generating the domain-specific term records by allocating within a memory the domain-specific term record having the information.

17. The computer-implemented method of clause 1, wherein identifying the target domain-specific term includes matching at least one text pattern within the text data with a domain-specific term from the set of domain-specific term records.

18. The computer-implemented method of clause 1, further comprising receiving a text pattern for identifying a new target domain-specific term within the text data; analyzing the text data to identify the new target domain-specific term; and generating a new template target domain-specific term record by allocating within a memory the new template target domain-specific term record with a title name being the new target domain-specific term when the new target domain-specific term is identified within the text data.

19. The computer-implemented method of clause 18, wherein the text pattern comprises at least one of a text string, a regular expression, a token, a part-of speech identifier, a named entity recognition tag, combination thereof, or wherein the text pattern includes a semantic role label, the semantic role label obtained by analyzing text data using a natural language processing model.

20. One or more computer-readable non-transitory storage media storing computer-readable programming instructions configured to be executed by one or more processors to execute receiving text data; identifying in the text data a target domain-specific term based on a set of domain-specific term records, each domain-specific term record including a domain-specific term and a term description; providing an interactive element corresponding to the target domain-specific term; receiving a signal indicating a user interacting with the interactive element; accessing a target domain-specific term record from the set of domain-specific term records corresponding to the target domain-specific term, to retrieve a target term description being a term description for the target domain-specific term, in response to the signal; and displaying the target term description using a domain-specific term associated knowledge card.

21. The one or more computer-readable non-transitory storage media of clause 20, wherein the target domain-specific term is one of a linguistic short form, a name of a product or service, an organization, an event, a task, a domain-specific construct, or a phrase containing natural language.

22. The one or more computer-readable non-transitory storage media of clause 20, wherein providing the interactive element includes generating a link for a text string within the text data corresponding to the target domain-specific term.

23. The one or more computer-readable non-transitory storage media of clause 20, wherein the signal indicating a user interacting with the interactive element comprises user clicking on a generated link.

24. The one or more computer-readable non-transitory storage media of clause 20, wherein displaying a target term description for the target domain-specific term using the knowledge card includes displaying a graphical user interface (GUI) configured to display the target term description.

25. The one or more computer-readable non-transitory storage media of clause 24, wherein the one or more processors are further configured to execute displaying, using the GUI, at least one of a list of people associated with the domain-specific term, a list of links to data files associated with the domain-specific term, a list of actions that can be performed by a user defining a behavior of the knowledge card, or notes associated to the domain-specific term.

26. The one or more computer-readable non-transitory storage media of clause 24, wherein the GUI is further configured to allow a user to edit at least one of a list of people associated with the domain-specific term, a list of links to data files associated with the domain-specific term, a list of actions that can be performed by a user defining a behavior of the interface, or notes associated to the domain-specific term.

27. The one or more computer-readable non-transitory storage media of clause 20, wherein the one or more processors are further configured to execute: providing an interface for displaying one or more domain-specific terms associated with the text data, wherein the interface is configured to display for the one or more domain-specific terms at least: domain-specific term names; term descriptions; and statistical information, the statistical information containing at least one of a number of times the one or more domain-specific terms are used, a number of links associated with the one or more domain-specific terms, or a number of notes associated with the one or more domain-specific terms.

28. The one or more computer-readable non-transitory storage media of clause 20, wherein the target domain-specific term record further includes at least one of a list of people associated with the domain-specific term, a list of links to data files associated with the domain-specific term, a list of actions that can be performed by a user defining a behavior of the interactive element, notes associated to the domain-specific term, a type of the target domain-specific term record, or one or more matching patterns for identifying the target domain-specific term.

29. The one or more computer-readable non-transitory storage media of clause 28, wherein the type is one of a project, a product, a team, an event, or a process.

30. The one or more computer-readable non-transitory storage media of clause 20, wherein the one or more processors are further configured to execute: receiving a request for accessing an administration panel interface for editing the set of domain-specific term records; providing the administration panel interface to a user; receiving, via the administration panel interface, instructions for changing one or more domain-specific term records of the set of domain-specific term records; and performing the instructions, thereby changing the one or more domain-specific term records of the set of domain-specific term records.

31. The one or more computer-readable non-transitory storage media of clause 20, wherein the one or more processors are further configured to execute generating a domain-specific term record, wherein the generating include: providing an interface for a user for selecting one or more text characters within the text data; identifying a domain-specific term based on the selected characters; and presenting a record-entering interface for allowing the user to enter information for generating a domain-specific term record related to the identified domain-specific term based on the identified domain-specific term; and generating the domain-specific term record by allocating within a memory the domain-specific term record having the user entered information.

32. The one or more computer-readable non-transitory storage media of clause 31, wherein the record-entering interface is configured to suggest at least one of a link to data related to the identified domain-specific term or one or more names of people for contacting regarding the information associated with the identified domain-specific term.

33. The one or more computer-readable non-transitory storage media of clause 32, wherein the text data comprises a plurality of text communication associated with a plurality of individuals, and wherein the one or more names are selected from names of the plurality of individuals based on a frequency of using the identified domain-specific term within the plurality of text communication associated with the plurality of individuals.

34. The one or more computer-readable non-transitory storage media of clause 20, wherein the one or more processors are further configured to execute generating one or more template domain-specific term records, wherein the generating include: using a text frequency analysis, identifying frequently used text patterns within the text data; based on the identified frequently used text patterns; selecting one or more frequently used text patterns as being one or more selected domain-specific terms; and allocating within a memory, the one or more template domain-specific term records, the one or more template domain-specific term records corresponding to the one or more selected domain-specific terms.

35. The one or more computer-readable non-transitory storage media of clause 20, wherein the one or more processors are further configured to execute generating one or more domain-specific term records, wherein the generating include: using a text frequency analysis, identifying frequently used text patterns within the text data; based on the identified frequently used text patterns, presenting a record-entering interface for allowing a user to enter information for generating the one or more domain-specific term records related to the identified frequently used text patterns; and generating the one or more domain-specific term records by allocating within a memory, the one or more domain-specific term records having the user entered information.

36. The one or more computer-readable non-transitory storage media of clause 20, wherein the one or more processors are further configured to execute generating a domain-specific term record, wherein the generating include: analyzing the text data to identify a linguistic short form within the text data; presenting a record-entering interface for allowing a user to enter information for generating the domain-specific term record related to the identified linguistic short form based on the identified linguistic short form; and generating the domain-specific term records by allocating within a memory the domain-specific term record having the user entered information.

37. The one or more computer-readable non-transitory storage media of clause 20, wherein identifying the target domain-specific term includes matching at least one text pattern within the text data with a domain-specific term from the set of domain-specific term records.

38. The one or more computer-readable non-transitory storage media of clause 20, wherein the one or more processors are further configured to execute: receiving a text pattern for identifying a new target domain-specific term within the text data; analyzing the text data to identify the new target domain-specific term; and generating a new template target domain-specific term record by allocating within a memory the new template target domain-specific term record with a title name being the new target domain-specific term when the new target domain-specific term is identified within the text data.

39. The one or more computer-readable non-transitory storage media of clause 38, wherein the text pattern includes at least one of a text string, a regular expression, a token, a part-of speech identifier, a named entity recognition tag, or combination thereof.

40. The one or more computer-readable non-transitory storage media of clause 38, wherein the text pattern includes a semantic role label, the semantic role label obtained by analyzing text data using a natural language processing model.

Structural & Functional Overview

The systems and methods discussed herein address challenges within the realm of knowledge management, recognizing that an average worker working with documents dedicates a considerable amount of time daily in the pursuit of relevant information. Particularly, during an onboarding process for new employees, it may take a considerable amount of time (e.g., a month) to the employee up to speed with over half of this time attributed to the time spent on information discovery and project familiarization.

Further, a challenge known as "analysis paralysis" is also recognized, where users face tedious, challenging, and slow processes in understanding, compiling, and synthesizing data for productive use. This challenge is further compounded in team settings, where awareness of existing documents or information may be lacking, making their retrieval a cumbersome task. This issue is not confined to corporate environments alone; it extends to students and researchers dealing with vast amounts of information.

While various knowledge management approaches exist, including tools like Glean, Notion, and Guru, these solutions exhibit significant flaws. Siloed applications necessitate constant updates and duplications of information, while integrated apps are rendered ineffective if they do not support the user's specific service. Knowledge bases, in general, impose ongoing pruning and organizational overhead, often resulting in the abandonment of outdated repositories.

To address various challenges associated with knowledge management in various embodiments, the systems and methods discussed herein provide a comprehensive knowledge management solution that surpasses the limitations of existing tools. The described systems and methods are programmed to help users efficiently find information, particularly in areas they are new to, thereby reducing the need for extensive back-and-forth communication seeking pre-existing information. Furthermore, the invention strives to empower users to recognize connections, generate insights, and discover previously unknown information within their knowledge domain. By addressing these goals, the proposed system seeks to revolutionize knowledge management, offering a more streamlined, efficient, and insightful approach for users across diverse applications.

The systems and methods disclosed herein enhance knowledge management, aiming to assist users in efficiently locating information, particularly within unfamiliar domains. The approaches proposed herein include the elimination of redundant communication seeking pre-existing information, facilitating users in recognizing connections and generating insights from their existing knowledge, and aiding in the discovery of previously unknown information.

Further, the systems and methods disclosed herein provide a dual-component approach to knowledge management, including knowledge organization (KO) and knowledge surfacing (KS). In the realm of knowledge organization, the system and methods provide approaches for at least partial automation of organizing knowledge. This includes manual or automatic capture of significant information in a self-organizing knowledge base. For knowledge surfacing, the system and methods are configured to provide an in-context experience. For example, users working with documents containing text are provided with an interface that allows access to the information without necessitating active searches for the information, with relevant data proactively presented within the provided interface alongside the documents with which the user is working.

Described systems and methods for providing automatic suggestions for domain-specific terms such as acronyms, abbreviations, names, and the like provide a practical application of technology that can markedly enhance computer functionality. Such systems and methods serve to elevate user comprehension by dynamically providing real-time explanations for encountered domain-specific terms identified within a text. In some embodiments, through the utilization of advanced natural language processing and machine learning algorithms, the provided systems adeptly identify and interpret domain-specific terms, thereby presenting an informative description to elucidate domain-specific terms meanings. The technology aligns with patent eligibility criteria by introducing a tangible and practical improvement in information accessibility, fostering clarity in communication, and presenting a concrete and innovative solution within the technological landscape.

The systems and methods outlined herein provide advanced capabilities, including nuanced contextual analysis, ongoing machine learning enhancements, adaptive learning mechanisms, seamless cross-platform integration, and a range of features designed to enhance accessibility. This ensures that users have instant access to a wealth of information without the need for extensive time investments in searching for explanations of various terms scattered across numerous documents within an organization.

The systems and methods described herein can be used to identify domain-specific terms in digital electronic documents, retrieve definitions, related resources, and information about related people that are relevant to the domain-specific term, and visually display the definitions, related resources, and information about related people that are relevant to the domain-specific term within the same user interface as an application in which the term appears in the document. The systems described herein include extensions that can be integrated in various applications, such as email, instant messaging, collaborative online document editing systems, word processing applications, spreadsheets, and other personal or enterprise productivity applications.

Distributed Computer System Example

FIG. 1A illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of automatically domain-specific knowledge, definitions, links to people, or links to resources relevant to a text to a user in association with a writing or text preparation application. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1A, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1A, but practical embodiments may include thousands to millions of computing devices 102 distributed over a wide geographic area or over the globe and hundreds to thousands of instances of text processor 140 to serve requests and computing requirements of the computing devices.

Computing device 102 comprises, in one embodiment, a central processing unit (CPU) 107 coupled via a bus to a display device 112 and an input device 114. In some embodiments, display device 112 and input device 114 are integrated, for example, using a touch-sensitive screen to implement a soft keyboard. CPU 107 can be configured to execute commands of operating system 104, which may include a kernel, primitive services, a networking stack, and similar foundation elements implemented in software, firmware, or a combination. Operating system 104 supervises and manages one or more other programs. For purposes of illustrating a clear example, FIG. 1A shows the operating system 104 coupled to an application 106 and a browser 108, but other embodiments may have more or fewer apps or applications hosted on computing device 102.

At runtime, one or more of application 106 and browser 108 loads, or are installed with, a text processing extension 110A, 110B, which comprises executable instructions that are compatible with text processor 140 and may implement application-specific communication protocols to rapidly communicate text-related commands and data between the extension and the text processor. Extensions 110A, 110B may be implemented as runtime libraries, browser plug-ins, browser extensions, or other means of adding external functionality to otherwise unrelated, third-party applications or software. The precise means of implementing extensions 110A, 110B or to obtain input text is not critical provided that an extension is compatible with and can be functionally integrated with a host application 106 or browser 108.

In some embodiments, an extension 110A may install as a stand-alone application that communicates programmatically with either or both of the operating system 104 and with an application 106. For example, in one implementation, extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user.

In some embodiments, each extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the extensions 110A, 110B is programmed to interoperate with a host application 106 or browser 108 to detect the entry of text in a text entry function of the application or browser and/or changes in the entered text to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The extension 110B is programmed to detect user selection of the text entry panel, the entry of text, or changes in the text within the panel, and to transmit all such text changes to text processor 140. In an embodiment, each extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

Network 120 broadly represents one or more local area networks, wide area networks, campus networks, or internetworks in any combination, using any terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private data center, public data center and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1A omits basic hardware elements of text processor 140, such as a CPU, bus, I/O devices, main memory, and the like, illustrating instead an example software architecture for functional elements that execute on the hardware elements. Text processor 140 may also include foundational software elements not shown in FIG. 1A, such as an operating system consisting of a kernel and primitive services, system services, a networking stack, an HTTP server, other presentation software, and other application software. Thus, text processor 140 may execute at a first computer, and extensions 110A, 110B may execute at a second computer.

In an embodiment, text processor 140 comprises a change interface 142 that is coupled indirectly to network 120. Change interface 142 is programmed to receive the text changes that extensions 110A, 110B transmit to text processor 140, and to distribute the text changes to a plurality of different checks 144A, 144B, 144C. To illustrate a clear example, source text 130 of FIG. 1A represents one or more documents that computing device 102 is viewing or reading via extensions 110A, 110B, and/or text changes that extension 110B transmits to change interface 142. In an embodiment, change interface 142 is programmed to distribute each and every sentence or paragraph of a document that is being read and/or text change arriving from extensions 110A and/or 110B to all of the checks 144A, 144B, 144C, which execute in parallel and/or in independent threads. In various embodiments, source text 130 can be obtained from an e-mail application like GMAIL, an instant messaging application like SLACK, a web page that the browser 108 has accessed and rendered, or other applications.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processor extension that is executed at the second computer and programmatically receives the digital electronic object comprising the source text via a message initiated at the text processor extension and transmitted to the text processor; and/or the text processor extension executes in association with an application program that is executing at the second computer, the text processor extension being programmed to automatically detect a change in a text entry window of the application program and, in response, to initiate the message; and/or the text processor executes in association with a browser that is executing at the second computer, the text processor extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a knowledge suggestion check, and therefore it is also denoted "knowledge suggestion check 144C" in this description.

In an embodiment, knowledge suggestion check 144C comprises knowledge suggestion instructions 148, which interoperate with a data store 160. The data store 160 can be implemented partially in main memory, using technologies such as Redis, and in long-term storage technologies in non-volatile storage devices such as cloud-based disk storage. The data store 160 can be integrated with text processor 140 or implemented as separate storage. In an embodiment, data store 160 comprises a database, flat file system, object store, or another digital data repository. The data store 160 can be configured using a table schema or other data storage schema to store a large number of records, each record comprising at least one or more hash values of text units in association with user identifiers. The structure and use of such records are described further in other sections herein.

Text processor 140 further comprises a set of stored program instructions that implement a similarity function, which can be configured as a scheduled job to periodically read and transform or use data in data store 160.

As further described herein in connection with FIG. 1A, in an embodiment, knowledge suggestion instructions 148 are programmed, in part, to output a knowledge card 132 to transmit to extension 110B. The knowledge card 132 comprises one or more suggestions of definitions of terms, acronyms, industry-specific jargon, project names or other terms that have meaning only within a particular enterprise or organization, and other elements, links to descriptions of relevant people in an enterprise such as those working on a related project, links to networked resources such as documents, websites, videos, or recordings, or other data relevant to the detected term or acronym in the source text 130.

Figure 1B:
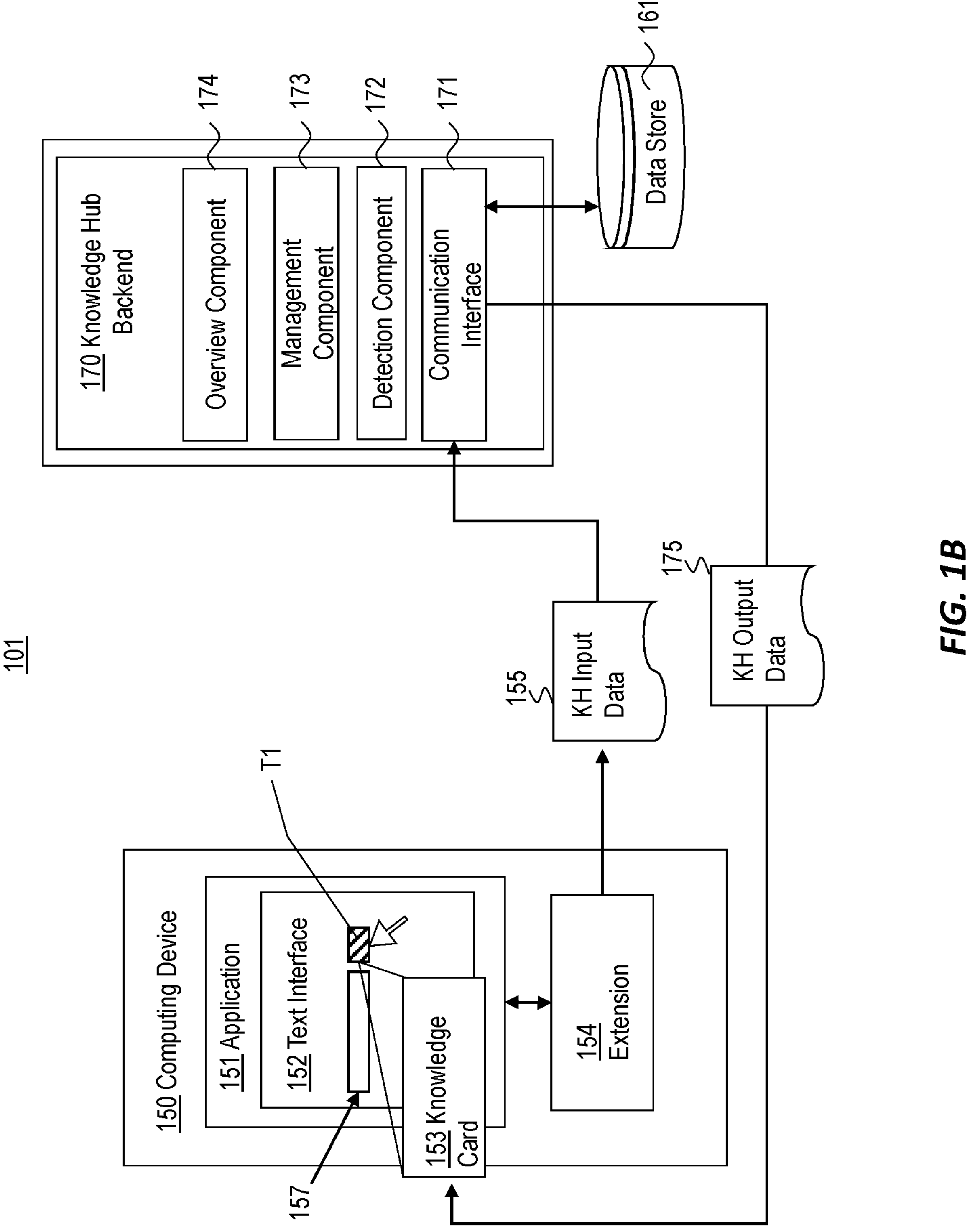
FIG. 1B is another example system for automatic suggestion of domain-specific knowledge according to an embodiment.

FIG. 1B shows another embodiment of a system 101 which may be similar in function or in structure to system 100, as shown in FIG. 1A. Similar to system 100, system 101 includes a computing device 150 which can be structurally or functionally similar to computing device 102 of system 100. Further, system 101 includes a knowledge hub (KH) backend 170 configured to interact with computing device 150, as well as data store 161. KH backend 170 of system 101 and text processor 140 of system 100 may be configured to perform similar functions.

Computing device 150 includes an application 151 having a text interface 152 for displaying text data 157. Application 151 may take the form of any suitable software designed for the presentation of text data. For example, it could be an email application, a word processing application, a slide presentation application, a PDF viewing application, a chat application, a work management application, or any other application specifically configured to display and/or edit text.

Text interface 152 is configured to display any suitable text data 157. For example, text data 157 may include text characters from any suitable language and may incorporate special characters, mathematical symbols, icons, bullets, or, in certain instances, emojis or images. In various embodiments discussed herein, certain elements of the text data 157 may be identified as elements for which additional information is available or desirable. Such elements herein are referred to as domain-specific terms and are shown in FIG. 1B as domain-specific term T1. The domain-specific terms may include abbreviations and acronyms collectively referred to herein as linguistic short form. Further, the domain-specific terms may include individual words, text characters, or even text patterns and regular expressions.

In some cases, a user can identify the domain-specific terms within the text (as further described below), and in other cases, a user can provide pattern rules that can be used for identifying the domain-specific terms within text data 157. Additionally, or alternatively, a detection component 172 of KH backend 170 may be used for identifying the domain-specific terms within text data 157, as further discussed below. Further, in some instances, extension 154 may also be used to identify at least some of the domain-specific terms within text data 157.

In various embodiments, after a domain-specific term is identified within text data, such as domain-specific term T1, as shown in FIG. 1B, a knowledge surfacing (KS) knowledge card 153 is configured to "surface" when a user working with text data 157 requires additional information about domain-specific term T1. The term "surface" refers to a process of appearance of knowledge card 153 upon a user interacting with as an interactive element within text interface 152. Various implementations of the knowledge card 153 are further described below in relation to FIGS. 2A and 2B. Knowledge card 153 is configured to show a term description for the domain-specific term T1, as well as various other information (e.g., links to various documents, webpages and information sources, list of people with a knowledge of domain-specific term T1, and the like, as further described below).

In various implementations, knowledge card 153 may be configured to surface based on an extension 154. Extension 154 may be similar or identical in function and/or implementation as extensions 110A and 110B, as shown in FIG. 1A. For example, extension 154 may include executable instructions that are compatible with application 151 and may implement application-specific communication protocols to rapidly communicate KH input data 155 between the extension and KH backend 170. KH input data 155 may include commands to KH backend 170 as well as text data. In an example implementation, extension 154 may be an add-in, a plugin, or any other suitable extension for adding additional functionality to application 151.

Figure 1C:
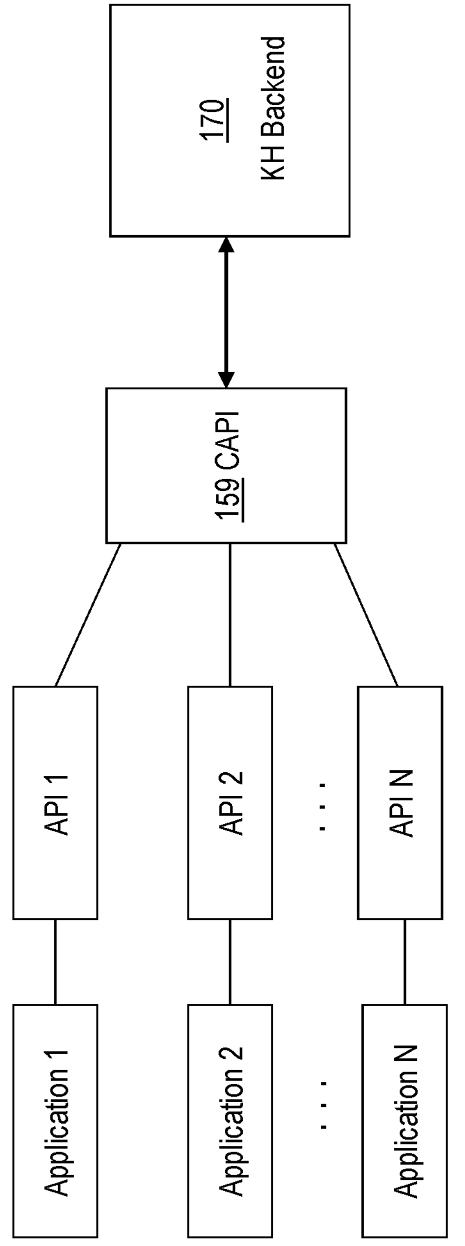
FIG. 1C is a diagram displaying application programming interfaces (APIs) for interaction between various applications and a knowledge hub (KH) backend according to an embodiment.

In various embodiments, KH backend 170 may be configured to interact with various applications (e.g., with an email application and a word processing application), and a suitable extension may be developed as an application-specific extension for facilitating such interaction. For example, one extension may be used for an email application, and another extension may be used for a word processing application. Such extensions provide an Application Programming Interface (API) for interacting with KH backend 170. FIG. 1C shows an example diagram of multiple applications (Application 1-Application N) interacting using corresponding API 1-API N with a Common Application Programming Interface (CAPI) 159 of the KH backend 170. API 1-API N may be suitable extensions designated for Application 1-Application N.

Extension 154 may be configured to communicate with KH backend 170 based on a user interacting with an interactive element displayed within text interface 152. Such interactive element can, for example, be a link, and underline of a text, or any other suitable graphical user interface positioned in close proximity of domain-specific term T1, indicating that the interactive element is related to domain-specific term T1. In one example implementation, the interactive element may be a link that can be clicked by a user. Such links may be provided (e.g., generated) by extension 154 for the domain-specific term T1. Upon the user clicking on the link, extension 154 may be configured to send KH input data 155 to KH backend 170, the KH input data 155 including a signal (e.g., a command) for retrieving data from KH backend 170, as well as information about domain-specific term T1 (e.g., a text string representing domain-specific term T1, a text pattern associated with domain-specific term T1, a regular expression associated with domain-specific term T1, and the like). In some cases, extension 154 may also be configured to send at least some text data in proximity of domain-specific term T1 to KH backend 170 to establish a context for domain-specific term T1.

In some cases, depending on a particular implementation of system 101, as further described below, extension 154 may be configured to provide text data 157 to KH backend 170 for a continuous analysis of text data 157 as it appears within text interface 152. For example, as text data 157 is being entered into text interface 152 it can be continuously provided to KH backend 170. Additionally, or alternatively, as text data 157 is being scrolled during reading, it can be continuously provided to KH backend 170. In some cases, text data 157 may be provided to KH backend 170 in text data units (e.g., in paragraphs, pages, sections, chapters, and the like). In certain cases, if the user has access to the complete text data 157, it can be directly submitted to the KH backend 170 for comprehensive analysis.

KH backend 170 includes a communication interface 171, a detection component 172, a management component 173, and an overview component 174. Communication interface 171 is configured to receive KH input data 155, and perform actions based on the commands communicated within KH input data 155. For example, if KH input data 155 includes a command of displaying information associated with domain-specific term T1, communication interface 171 may be configured to interpret the command within KH input data 155, and facilitate data interaction with detection component 172, management component 173, overview component 174, as well as data store 161. In some implementations, data transfer between computing device 150 and KH backend 170 may be performed securely, by, for example, utilizing a secure shell (SSH) encryption. Furthermore, interaction between KH backend 170 and data store 161 may also be performed securely.

Detection component 172 is configured to perform various tasks for identifying domain-specific term records corresponding to domain-specific terms, as well as detecting domain-specific terms within text data 157.

In one particular implementation, when KH input data 155 includes information about a particular domain-specific term, such as domain-specific term T1, detection component 172 is configured to identify a domain-specific term record corresponding to domain-specific term T1 and communicate an identifier for the domain-specific term record to communication interface 171. In turn, communication interface 171 is configured to communicate with data storage 161, to retrieve information from the identified domain-specific term record, and to provide KH output data 175 containing the information retrieved from data storage 161. The KH output data 175 can then be presented as knowledge card 153.

In another implementation, detection component 172 may be configured to receive KH input data 155 containing text data 157 (or at least portions of text data 157, such as phrases, sentences, paragraphs, and the like), and analyze text data 157 to identify within text data 157 domain-specific terms.

The domain-specific term may be identified as a text string that matches a pattern of a date in a form of MM/DD/YYYY, or any other suitable regular expression or a pattern. For instance, the expression "NASA\d" may be used as a domain-specific term matching any instance of the acronym NASA followed by a digit (e.g., NASA2). In some cases, the position of the word within a sentence may be evaluated to identify a domain-specific term. For example, a regular expression "^API" may identify "API" as a domain-specific term if it is at the beginning of the sentence, but may not identify "API," otherwise, if it is located at any other position within the sentence. Similarly, any other suitable patterns may be used to identify a domain-specific term as known in the art. For instance, a word followed by a period in the middle of a sentence may be identified as an abbreviation, a word that is not in a language vocabulary may be identified as a linguistic short form, or words that are associated with a specific part of speech may be selected as domain-specific terms.

In some instances, to identify domain-specific terms, a token matching approach can be used. The token matching involves the method of text tokenization, where the input text is segmented into individual tokens, such as words or subwords. The matching process is then executed at the token level, mitigating the risk of matching substrings within words. For instance, if the token "her" is sought in a tokenized text like ["This", "is", "a", "herring", "."], it would not erroneously match the substring "her" within the word "herring."

In some instances, token matching can be combined with a form of token-level regular expressions (regex). This hybrid method allows users to specify additional conditions for matching, such as requiring a word to be followed by specific words. For instance, it enables matching occurrences of "reader" only when followed by "project" or "team" in a tokenized text.

Further, in some instances, the token matching is further refined by incorporating Part-of-Speech (POS) constraints. Using such an approach, tokens within text data 157 are matched only if they possess a specific POS tag, adding a linguistic dimension to the matching process. For example, the system may be configured to match tokens only if they have a POS value of "noun" or "verb" in the tokenized text.

Additionally, in some cases, tokens may be selectively matched based on predetermined Named Entity Recognition (NER) tags, allowing for more precise and context-aware matching. An example scenario involves matching a token like "intelligence" only if it is identified as an organization (e.g., ORG) by a NER system. NER entities may include persons, organizations, locations, dates, numerical values, and other elements that are uniquely identifiable. For example, Microsoft may be identified as an organization, and the Eiffel Tower may be identified as an architectural landmark.

In various embodiments, a domain-specific term may be a linguistic short form, a name of a product or service, an organization, an event, a task, a domain-specific construct, or a phrase containing natural language. In certain instances, a domain-specific term within text data 157 may necessitate an explanation, especially when its meaning is not readily discernible from the context of the text or is not expected to be familiar to the user. For instance, consider the following text: "Hi, the marketing team improved our CAC by 14%. We are glad to let you know that the project Papaya is finally being released, and we attribute our success to improvements in our thermomechanical eddy current damping system." This text may contain domain-specific terms such as "CAC," "Papaya," and "thermomechanical eddy current damping system," which might not be within the typical user's knowledge base and could benefit from further clarification. In some cases, as discussed above, such terms may be identified by a user, and in other cases, as further discussed below, various rule-based (e.g., pattern-based) or machine-learning approaches may be used for identifying such domain-specific terms.

It should be noted that aside from or in addition to utilizing detection component 172, the identification of certain domain-specific terms may also be facilitated by extension 154. To illustrate, extension 154 can be configured to recognize domain-specific terms through a rule-based methodology, employing techniques such as regular expressions. Additionally, it may offer a supplementary interface for users to input details describing these domain-specific terms. Further description of this aspect is provided in the subsequent discussion related to FIGS. 2A and 2B.

Management component 173 is configured to perform various tasks related to editing and/or creating domain-specific term records. In some cases, such records may be created manually, by a user filing information using an administrative panel associated with management component 173, as further described below in relation to FIGS. 2A and 2B.

Additionally, or alternatively, such domain-specific term records may be created using suitable machine learning approaches for analyzing various documents accessible to an organization utilizing system 101. For example, a natural language processing model may be used to analyze a variety of documents accessible to the organization, and, for a particular domain-specific term, generate, based on information from the analyzed documents, a description of the domain-specific term. For example, such generation may be accomplished by a generative pre-trained transformer machine learning model (e.g., a natural language processing model). In some instances, such generative pre-trained transformed may be a large pre-trained foundation model, or it may be finetuned model for generating descriptions for domain-specific terms based on the documents accessible to the organization.

In some cases, management component 173 may not only be configured to generate a term description for a domain-specific term but also to generate links to documents related to the domain-specific term and/or generate a list of people related to the domain-specific term, as further described below in relation to FIGS. 2A and 2B. In some cases, when management component 173 generates information associated with the domain-specific term, the management component 173 may present a user an interface for approving the entry of the information into a domain-specific term record to ensure the accuracy of the domain-specific term record. In some cases, management component 173 may be configured to create one or more hub pages that link to various documents pertaining to the domain-specific term, while providing links within the domain-specific term record to the one or more hub pages. In some cases, management component 173 may be configured to extract information from various sources that is related to the domain-specific term, and present the extracted information on the one or more hub pages. In some cases, natural language processing models may be used to organize such information on the one or more hub pages by presenting a summary of information, keywords, list of topics, and the like.

As shown in FIG. 1B, KN backend 170 further includes an overview component 174 configured to collect information that can be used for overviewing various domain-specific terms used within text data 157. The collected information may include a list of domain-specific terms within text data 157, as well as various statistical variables (e.g., how frequently a domain-specific term is used within text data 157) associated with such domain-specific terms. Overview component 174 is further described b below in relation to FIGS. 2A and 2B.

Data store 161, as shown in FIG. 1B and associated with system 101 may be similar or identical in function or in structure to data store 160 shown in FIG. 1A. In various embodiments, data store 161 is configured to store domain-specific term records associated with various domain-specific terms identified within a collection of documents accessible by an organization. Further, data store 161 is configured to communicate data with communication interface 171 of KH backend 170.

Graphical User Interface Example

Figure 2A:
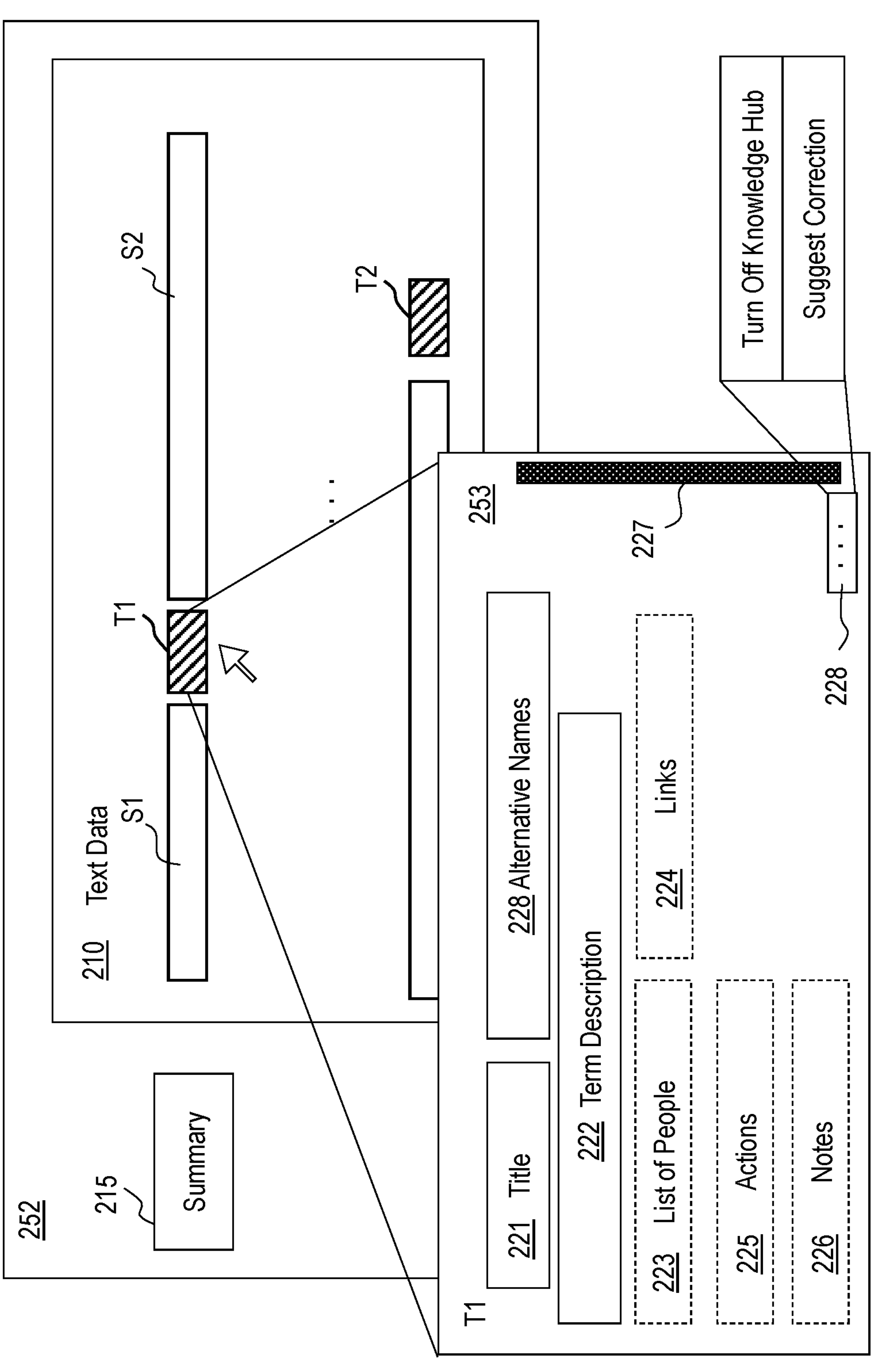
FIG. 2A is an example interface for interacting with the system of the embodiment shown in FIG. 1B according to an embodiment.
Figure 2B:
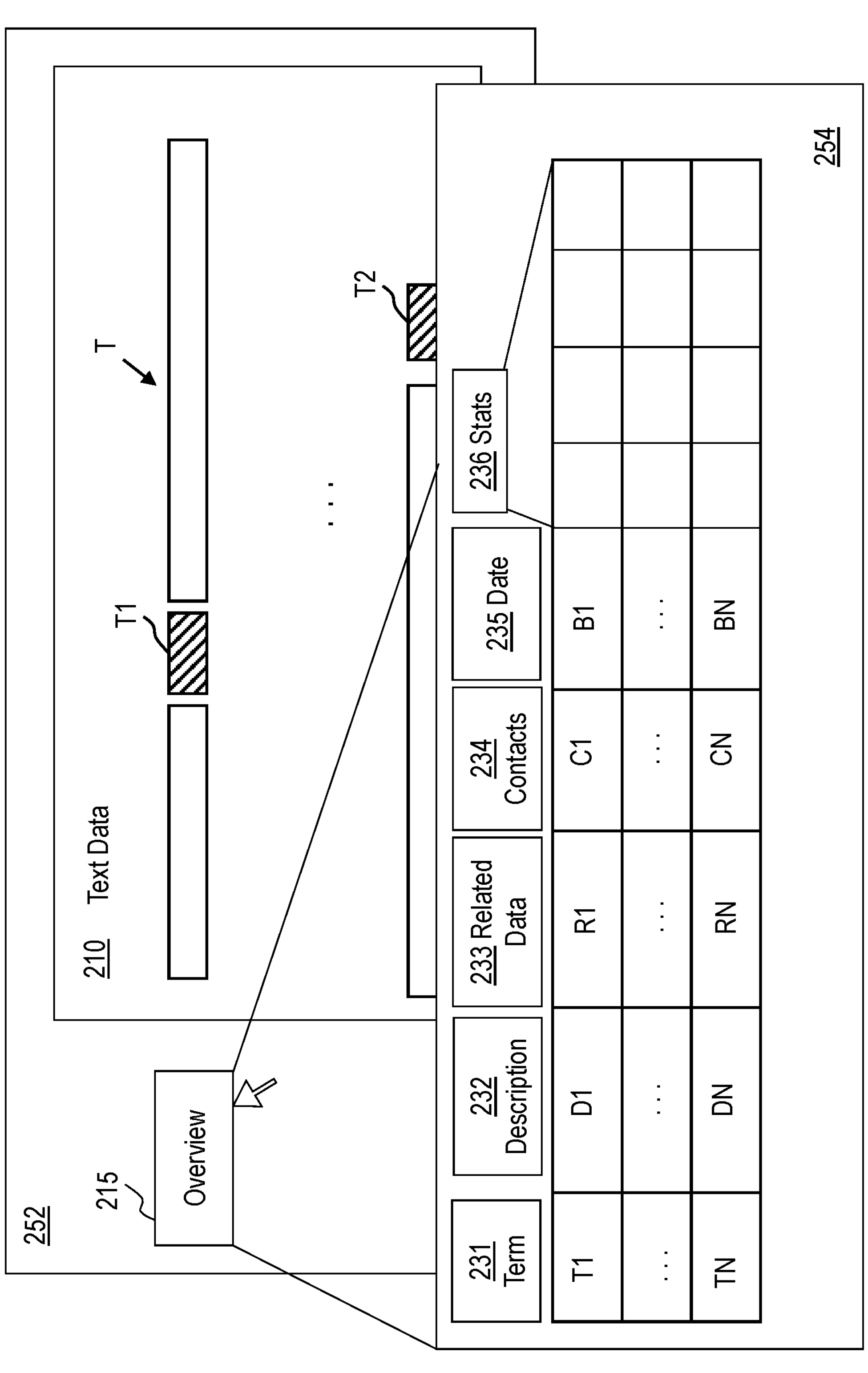
FIG. 2B is an example overview interface according to an embodiment.

FIG. 2A and FIG. 2B show further details of interfaces that can be used to review information associated with one or more domain-specific terms within text data. In some cases, such interfaces can be also used for entering information about new domain-specific terms, thereby forming new domain-specific term records, or editing information associated with previously existing domain-specific term records. FIG. 2A shows an example text interface 252 that may be similar or identical to text interface 152, as shown in FIG. 1B. Text interface 252 includes text date 210 which can include text strings S1 and S2, and domain-specific terms T1 and T2. As previously discussed, domain-specific terms such as domain-specific terms T1 and T2 can include words, phrases, patterns, and the like. For example, domain-specific terms T1 and T2 may be linguistic short forms (e.g., acronyms or abbreviations), names of products or services, organizations, events, tasks, domain-specific constructs, or any suitable phrase containing natural language.

In an illustrative embodiment, the text interface 252 may incorporate interactive elements linked to domain-specific terms T1 and T2. These interactive elements could take the form of clickable links, icons, buttons, underlining, or any suitable graphical user interface (GUI) elements strategically placed in proximity to the words associated with domain-specific terms T1 and T2. When a user interacts with these elements, such as by clicking or hovering with a mouse, they are configured to display a domain-specific term knowledge card 253, as depicted in FIG. 2A.

In an exemplary embodiment, when a user engages with an interactive element related to the domain-specific term T1, the signal indicating this interaction is transmitted to the communication interface 171 through extension 154. Subsequently, communication interface 171 communicates with the detection component 172 to discern a domain-specific term record associated with T1. Once the detection component 172 successfully identifies the domain-specific term record, the corresponding identifier is relayed to the communication interface 171. Subsequently, the communication interface 171 retrieves relevant information from the domain-specific term record stored in data store 161. The obtained information is then presented on the knowledge card 253 for user reference.

As shown in FIG. 2A, knowledge card 253 may be a suitable graphical user interface, such as a pane, a window, that is configured to include a title data field 221 (herein, for brevity, also referred to as a title 221) associated with domain-specific term T1, and a term description data field 222 (herein, for brevity, also referred to as a term description 222) specifying information about domain-specific term T1. For example, when domain-specific term T1 represents an acronym, term description 222 may specify a definition for that acronym.

In addition to title 221 and term description 222, knowledge card 253 may optionally include other data fields such as list of people 223, associated with domain-specific term T1, links 224 linking documents, webpages, and any other suitable data related to domain-specific term T1, actions 225 that can be performed to adjust behavior of knowledge card 253 and/or the interactive element causing the appearance of knowledge card 253, settings associated with knowledge card 253, or notes 226 associated with domain-specific term T1. Furthermore, as shown in FIG. 2A, domain-specific term T1 may include a scroll bar 227 for allowing a user to scroll to display various portions of knowledge card 253.

The list of individuals, denoted as list of people 223, can include expert well-versed in the domain-specific term T1. If T1 represents an organization, event, project, or group, list of people 223 may include individuals affiliated with the organization, attendees of the event, or participants in the project or group. Notably, list of people 223 might include pertinent contact details for these individuals, including emails, phone numbers, addresses, and similar information. Furthermore, the names of individuals within the list of people 223 may be rendered as clickable links. Upon clicking on these links, users can access additional information about the individual of interest.

The hyperlinks, denoted as links 224, can lead to diverse knowledge data associated with the domain-specific term T1. In certain scenarios, the links 224 may connect to other knowledge cards that are pertinent to the content presented on knowledge card 253.

Upon clicking on actions 225, an interface may be presented to a user, and may allow a user to adjust the behavior of knowledge card 253. For example, a user may select to deactivate the interactive element corresponding to domain-specific term T1 when knowledge for domain-specific term T1 is not needed to be surfaced for the user. The deactivation of the interactive element may lead to deactivation of surfacing of knowledge card 253. In an example implementation, a hyperlink may be presented to a user that indicates that knowledge card 253 should not be presented. An input from a computing device to select the hyperlink causes communication interface 171 to store, in data store 161, a column attribute specifying that the term represented in the knowledge card 253 should not be displayed for the currently logged-in user.

In some cases, the actions 225 may include controlling a behavior or knowledge card 253. For example, if the actions 225 include an option to select a summary of knowledge card 253, only a brief description for domain-specific term T1 may be shown in knowledge card 253.

Furthermore, knowledge card 253 may include notes 226, which serve to offer additional insights for a clearer understanding of term description 222. In certain instances, these notes, contributed by users who have accessed knowledge card 253, consist of multiple text records. Each text record provides information related to the user, organization, or entity (e.g., a group, a software, an anonymous user, etc.) responsible for the note. This information covers contact details, such as the user or entity name, email, phone number, facilitating potential communication with the respective user or entity.

In some cases, knowledge card 253 may have additional settings 228 (e.g., represented by GUI having triple dots) indicating additional behavior for either knowledge card 253 and/or knowledge hub backend 170. For example, an input from a user interacting with settings 228 can allow the user to expose function links titled Turn Off Knowledge Hub and/or Suggest Correction. Input from the user to select the function link titled Suggest Correction can signal the communication interface 171 to receive input from the computing device to update the knowledge card.

In some cases, knowledge card 253 may present information differently depending on a context of the domain-specific term encountered in text data 210. For example, in some cases, to avoid overwhelming users with excessive information, such as presenting a card containing an unwieldy number of links, for instance, knowledge card 253 may select what information to present to the user based on the context. For instance, when a user encounters a specific domain-specific term, a KH backend may analyze contextual nuances surrounding that domain-specific term, and display the information relevant to the content.

Moreover, the control over the selection of domain-specific terms identified within text data using an interactive approach can be refined. Specifically, the system may refrain from selecting domain-specific terms already known to the user, particularly within the context of specific terms or projects, in order to avoid overwhelming the user. The user's familiarity with a particular domain-specific term can be gauged by monitoring whether the user has previously accessed a knowledge card associated with that term. Additionally, users may be granted the capability to override various settings, including the choice to not select a particular domain-specific term.

In certain implementations, users have the capability to update or edit knowledge card 253 by directly modifying information in term description 222 or any other details displayed on knowledge card 253. For instance, term description 222 may be presented as an editable field within knowledge card 253, allowing users to make changes by typing directly into the field. In some scenarios, knowledge card 253 may permit alterations without necessitating the user to select the "Suggest Correction" link. Beyond modifying term description 222, users may also be granted the ability to make changes to the list of people 223, links 224, or notes 226.

In some implementations, a user can have an option to provide alternative names 228, as shown in FIG. 2A, or aliases for the domain-specific term described in knowledge card 253. These aliases can function as alternative names for the domain-specific term and will be recognized within the text data. If any such alias appears in the text data, it will be associated with knowledge card 253.

In various embodiments, when a user makes changes to knowledge card 253, these alterations may be retained for that specific user, remaining invisible to other users. Consequently, knowledge card 253 may exhibit distinct information for different users, and the domain-specific term records stored within data store 161 may include diverse domain-specific term records tailored to individual users. In certain situations, a user may revert to one of the previous versions of knowledge card 253, omitting any recent changes made by that user.

It's important to note that, in some cases, certain changes initiated by a user (e.g., notes added to knowledge card 253) may be disseminated to knowledge cards of other users upon, for example, the user's confirmation that such dissemination is necessary and after verifying that the added information is pertinent to the domain-specific term for which the change was introduced. To ensure information accuracy, a voting mechanism may be employed, wherein a minimum number of identical corrections from different users must be received before the correction is disseminated into knowledge cards of other users. This minimum number can vary, ranging from a single user to several users. Additionally, different domain-specific terms may have distinct threshold numbers based on their significance and widespread usage. For instance, less crucial or less commonly used domain-specific terms may require only a few users to validate information changes in knowledge card 253, while more critical or widely used terms may necessitate multiple user validations or confirmations of alterations before acceptance into the common domain-specific term record associated with that term (herein common domain-specific term record is a record that is available for all the users). In some cases, a user can select knowledge card 253 to display information from the common domain-specific term record, or to display information from the personal domain-specific term record.

Alternatively or additionally, to ensure the accuracy of user-added information, machine learning methods may be employed to analyze the added/edited information and determine its accuracy. Machine learning models, such as natural language processing models, could scrutinize various documents to verify that the added/edited information accurately describes the domain-specific term for which it is to be added/edited. Furthermore, a machine learning model may assess the relevance of links and people added/edited by the user to determine if such changes are related to the domain-specific term. For instance, if people added by the user are frequently mentioned in other documents discussing the domain-specific term, the addition of such people may be deemed relevant to knowledge card 253. Similarly, if links added by a user point to documents commonly referenced when discussing the domain-specific term, the addition of such links may be considered accurate.

In certain instances, the text interface 252 provides users with the capability to select a specific domain-specific term within the text data 210. This selection can be achieved by actions such as highlighting a text string, selecting characters or strings within the text data 210, or utilizing an interface for entering commands like a regular expression to identify a particular section of the text data 210 as a domain-specific term. Upon the selection of characters or text strings, the text interface 252 identifies a domain-specific term (e.g., by highlighting the selected text characters or strings) and is configured to present a record-entering interface to a user. This record-entering interface allows the user to input information for generating the domain-specific term record associated with the identified term.

The record-entering interface may mirror the structure of the knowledge card 253, featuring fields such as a title field, a term description field, a list of people associated with the domain-specific term, a list of links, a field for notes, and a field for entering alternative names for domain-specific term. After the user inputs information and confirm it by submitting, the extension 154 communicates the submitted data to the communication interface 171. Subsequently, the communication interface 171 generates a domain-specific term record by allocating the user-entered information within the memory. This domain-specific term record is then stored in the data store 161 for future reference.

FIG. 2B introduces an additional element of text interface 252, featuring an overview interface 254 activated when a user engages with an interactive element 215, which could be a link labeled "Overview," a graphical user interface (GUI), or a similar element. The presentation of the overview interface 254 is triggered either by a user clicking on interactive element 215 or by the user hovering a mouse over it.

Upon activation, overview interface 254 surfaces, presenting a tabulated summary of various domain-specific terms extracted from text data 210. In some cases, a user may be provided with an option for selecting documents for which overview information is collected and presented in overview interface 254. For example, the user can be provided with an option to collect overview information over a particular text data, over a few documents, over a group of documents, or over all of the documents within an organization.

The tabulated summary presented in the overview interface 254 may include several columns for enhanced clarity and information retrieval. Column 231 displays the names of domain-specific terms (T1-TN), while column 232 provides concise descriptions (D1-DN) of each corresponding domain-specific term. Column 233 presents related data (R1-RN), potentially incorporating hyperlinks to diverse data sources.

Column 234 showcases contacts (C1-CN) associated with the domain-specific terms, offering valuable information about individuals linked to these terms. Furthermore, column 235 outlines the dates (B1-BN) when the domain-specific term records were initially created. In some instances, column 235 may also reveal the last accessed date of a knowledge card for each corresponding domain-specific term, or even offer a timeline depicting the access history.

The comprehensive overview interface extends its utility with multiple columns 236, furnishing diverse statistical insights tied to the domain-specific terms listed in column 231. Such statistical data may include the count of links, notes, or people associated with each domain-specific term. Additionally, it might include information such as the frequency of a domain-specific term's occurrence within text data 210 or the cumulative number of appearances across various documents available to users.

Figure 3:
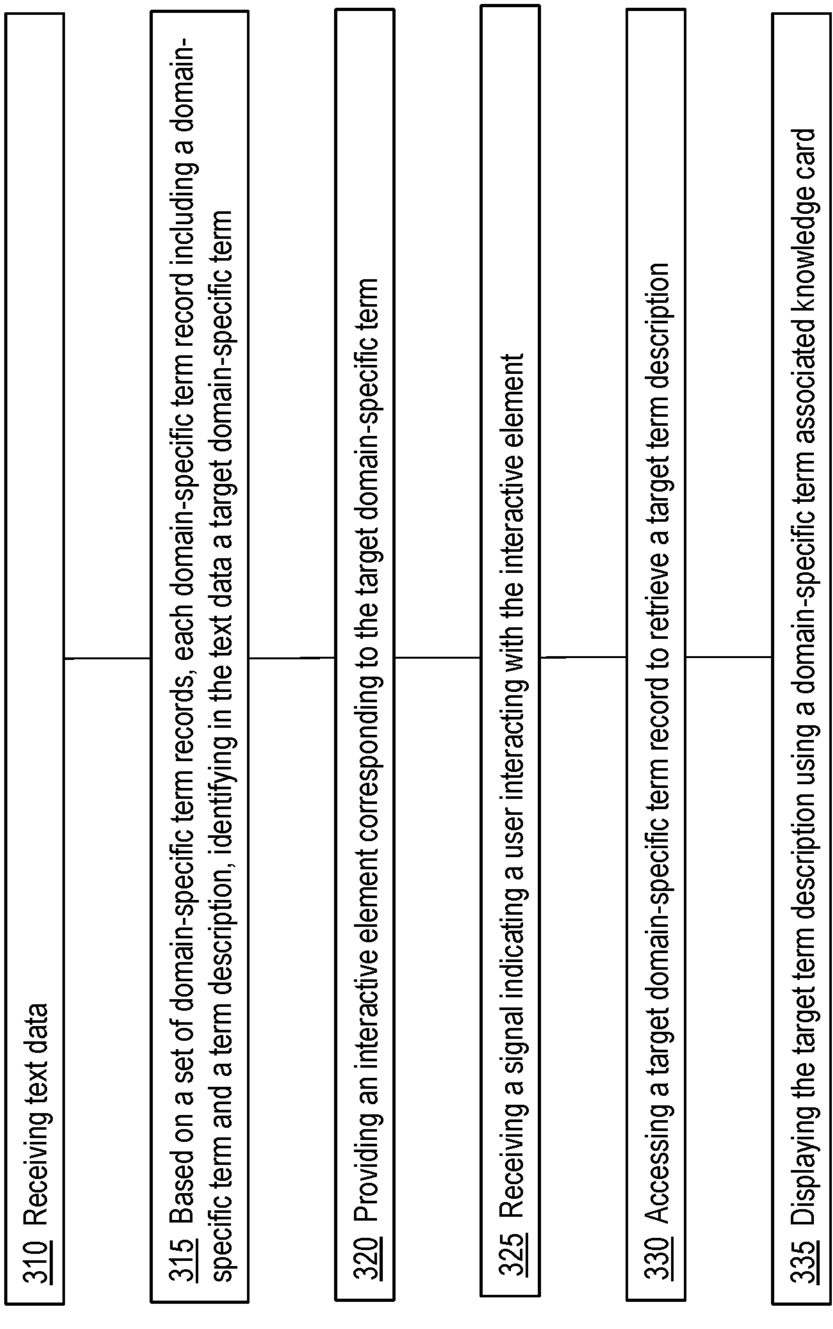
FIG. 3 is an example method for generating automatic suggestions according to an embodiment.

The systems and methods presented herein describe various methods for presenting information associated with one or more elements of text data. FIG. 3 shows one particular embodiment of such a method. FIG. 3 shows a method 300 that includes, at step 310 receiving text data, and at step 315, based on a set of domain-specific term records, each domain-specific term record including a domain-specific term and a term description, identifying in the text data a target domain-specific term. The set of domain-specific term records may be stored in a data store, such as data store 161, as shown in FIG. 1B, and communication interface, such as communication interface 171, may be configured to retrieve at least some information about the set of domain-specific term records (e.g., communication interface 171 may retrieve names of domain-specific terms associated with domain-specific term records), and identify in the text data the domain-specific terms matching the retrieved names.

Further, method 300 includes, at step 320, providing an interactive element corresponding to the target domain-specific term. As previously explained, this interactive element can take various forms, allowing user interaction through different interfaces such as a mouse, keyboard, touchscreen, and more. For instance, users can hover over the interactive element using a mouse or finger, click on it, position a cursor over it, and the like. In some cases, a user can tap or swipe at interactive element, or, in some cases, use voice commands to interact with interactive element.

Following step 320, method 300 includes, at step 325, receiving a signal indicating a user interacting with the interactive element. The signal may include a user clicking on the interactive element, hovering a cursor over the interactive element, or using any other suitable interface (e.g., a touch screen) for interacting with the interactive element.

At step 330, method 300 includes accessing a target domain-specific term record corresponding to the target domain-specific term, to retrieve a target term description for the target domain-specific term. In an example implementation, the signal captured by a suitable extension, such as extension 154, as shown in FIG. 1B, can be communicated to communication interface 171, which can cause communication interface 171 to retrieve the target term description from a target domain-specific term record located in data store 161. Once the target term description is retrieved, at step 335, method 300 includes displaying the target term description using a domain-specific term associated knowledge card, as described above in relation to FIGS. 2A and 2B.

Figure 4:
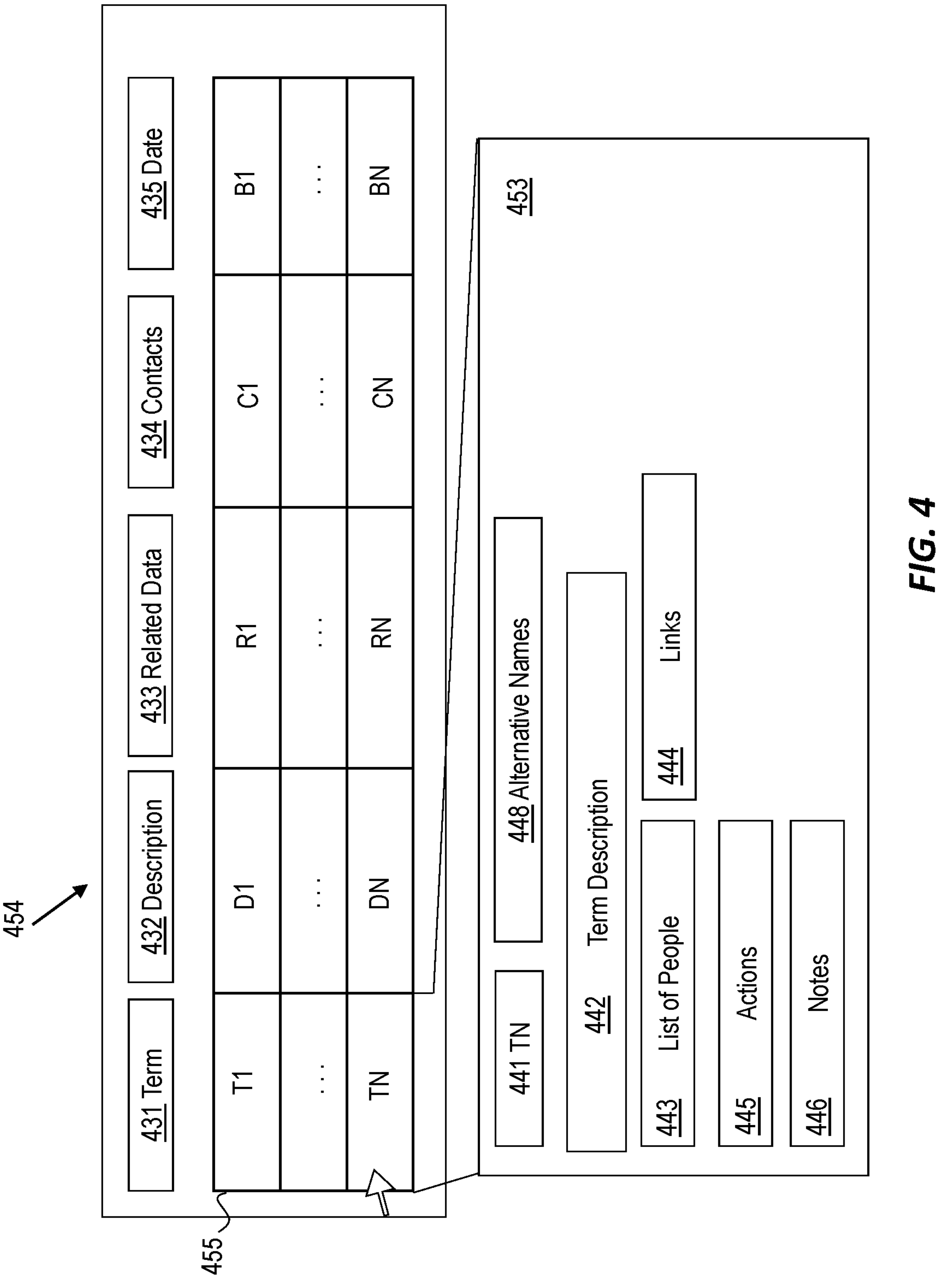
FIG. 4 is an example administrative panel for managing domain-specific terms according to an embodiment.

The disclosed system and methods further provide an interface for managing domain-specific terms that are identified in various documents available to users. FIG. 4 illustrates an administrative control panel 454 or "admin panel," which can be programmed to list various domain-specific terms that an enterprise has defined in various knowledge cards associated with these domain-specific terms. In an embodiment, the admin panel comprises a table 455 of rows, each row corresponding to a term that can be identified in a document, highlighted, and displayed in a knowledge card. Each row can have a plurality of columns such as term name 431 displaying names T1-TN, description 432 displaying descriptions D1-DN, related data 433 displaying data R1-RN, which may, for example include links to related documents, contacts 434 displaying contacts C1-CN, update date 435 displaying dates B1-BN, or any other suitable fields (e.g., notes, alternative names, actions, and the like) that can be associated with each domain-specific term in admin panel 454. In this manner, admin panel 454 presents a condensed view of complete domain-specific term records associated with domain-specific terms that the data store 160 or data store 161 stores. In some cases, admin panel 454 can display only domain-specific terms for a particular document or text data, a group of documents or text data, or even all of the documents available for an organization. Furthermore, in some cases, admin panel 454 may display a first set of domain-specific terms for a first user and a different second set of domain-specific terms for a second user. For example, when a first user is associated with a first set of documents and a second user is associated with a second set of documents, admin panel 454 may display domain-specific terms associated with the first set of documents for the first user and domain-specific terms associated with the second set of documents for the second user. Furthermore, if a first user has defined/edited his/her own domain-specific term records via, for example, a record-editing interface as discussed above, in a way that is different from the information contained in domain-specific term records of the second user, domain-specific terms displayed by admin panel 454 for the first user may be different from the domain-specific terms displayed by admin panel for the second user.

In various cases, various domain-specific term records can be stored in data store 160 or data store 161 using a relational table schema having a plurality of tables representing information in table 455, as shown in FIG. 4. For instance, a first table can store rows corresponding to domain-specific terms, each row having, for example, a first column storing a name of a domain-specific term in that row, a second column storing a description of the domain-specific term in that row, and a third column storing information about a link, a pointer, or a reference to a related data which can be any suitable documents, webpages or materials. Further, the table schema can further define, for example, a second table having a first column attribute for a name of a domain-specific term in that row, a second column attribute holding contacts table having one or more rows of contacts that are associated with the domain-specific term in that row, and a third column indicating a date at which the first and/or the second table have been updated. It should be understood that various other configurations of tables can be used. For example, the first and the second table can be combined into a single table, similar to table 455, as shown in FIG. 4, or more than two tables can be used to organize information as shown in table 455.

In certain instances, aside from the aforementioned columns, an additional column indicating the type of domain-specific term may also be stored within the domain-specific term record. Examples of possible types, not limited to, are "project," "product," "team," "event," "process," "group," or any other types associated with domain-specific terms (such as "location," "software program," "organization," "communication protocol," and more). Types may be predefined in some cases, with a list of options available for users to select a particular type for a domain-specific term. In other cases, users may have the flexibility to create their own custom types.

FIG. 4 shows that admin panel 454 may be configured to allow a user to edit various fields within table 455 rendered by admin panel 454. For example, a user can interface with table 455 (e.g., by clicking on or hovering a cursor over a particular row within table 455, such as a row for domain-specific term TN, as shown in FIG. 4), and upon such user action, extension 154 be configured to surface a new record-editing interface 453 for examining and updating various fields corresponding to domain-specific term TN. For example, as shown in FIG. 4, data fields may include a domain-specific term name 441, a term description 442, a list of people 443, links 444, actions 445, notes 446, and alternative names 448 that can be updated using record-editing interface 453. Data fields 441-448 are configured to correspond to data fields 221-228 of knowledge card 253.

In some implementations, admin panel 454 may also include an Add Term link which communicates to extension 154 to open a new record-editing interface similar to interface 453, to input a new domain-specific term. The new record-editing interface may include fields similar to fields 441-448 of record-editing interface 453, but with values for these fields being blank.

Figure 5:
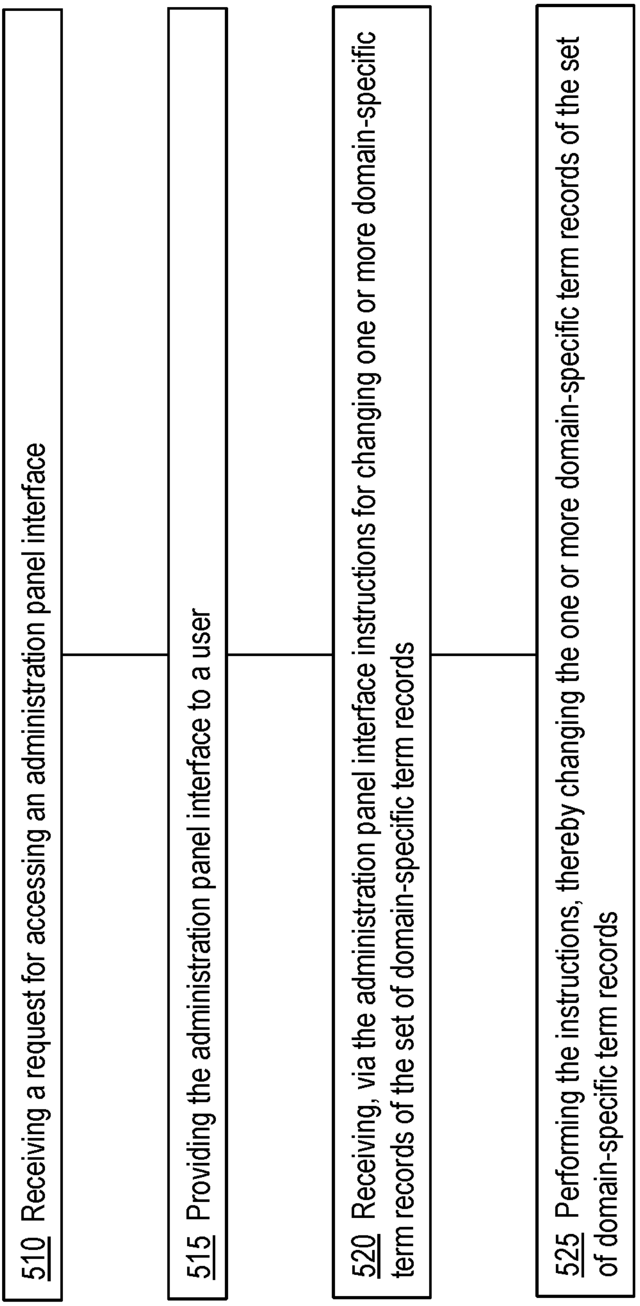
FIG. 5 is an example method for managing domain-specific terms according to an embodiment.

In an example embodiment, a process of modifying domain-specific term records using admin panel 454 is described by a method 500, illustrated in FIG. 5. The method 500 includes at step 510, receiving a request for accessing an administration panel interface such as interface of admin panel 454 for editing a set of domain-specific term records from a user. For example, a user may interact with application interface 252, as shown in FIG. 2A to request surfacing the interface for admin panel 454. In an example embodiment, application interface 252 may include an interactive element, which when interacted by a user, result in extension 154 providing the administration panel interface to a user at step 515. Further, method 500 may include at step 520 receiving, via the administration panel interface instructions for changing one or more domain-specific term records of the set of domain-specific term records, and at step 525 performing the instructions, thereby changing the one or more domain-specific term records of the set of domain-specific term records.

It should be noted that in some implementations, admin panel 454 may provide an interface for uploading multiple domain-specific term records in a batch mode using a file containing such domain-specific term records. For instance, admin panel 454 may allow users to upload a file, such as a comma-separated value (CSV) file, including entries detailing diverse domain-specific term records.

In various embodiments, admin panel 454 may be controlled by an administrator who can determine various permissions for different users. For example, the administrator can determine which user can add, edit, or remove information from domain-specific term records stored in data store 160 or 161.

In some cases, if a user encounters a domain-specific term needing explanation, they can create a template domain-specific term record for it using the record-editing interface. This domain-specific term record can then be flagged by a user to indicate missing information, needing input from other users. Highlighted in the admin panel, these flagged entries can attract attention and allow other users to enter related information for such domain-specific term record. Note that admin panel 454 can provide an option to flag the template domain-specific term record. Additionally, or alternatively, such an option may be provided to a user when a user views a knowledge card, such as knowledge card 253. In certain instances, diverse flags may be employed based on the nature of the input requested. For instance, a first flag may signify a requirement for additional information, while a second flag could indicate the user's belief in the inaccuracy of information within the domain-specific term record. Several other flags can also be incorporated, including a third flag denoting the urgency of a need for editing an entry in the domain-specific term record. The urgency level can be communicated through the use of differently colored flags.

Detecting, Generating, and Updating Domain-Specific Term Records Based on Document Analysis and Natural Language Processing In various embodiments, the systems and methods described herein can be utilized to identify a range of information for supplementing or even generating domain-specific term records. For instance, when a record-entering interface is presented to a user, such as record-entering interface 453, it may be configured to provide suggestions for populating data fields 441-445 or even data fields 446 and 448. These suggestions may cover term descriptions for populating data field 442, as well as one or more links to data relevant to the particular domain-specific term for populating data field 444. Additionally, the provided suggestions may include names of individuals, along with their contact information, who can be contacted for additional information related to the domain-specific term, thereby populating data field 443. In some cases, suggestions for notes may also be presented to populate data field 446. For example, if a project deadline is approaching, a suggestion for a note can be presented to the user for populating data field 446. Further, suggestions for alternative names 448 may also be presented to the user.

In some cases, when text data, such as text data 210, as shown in FIG. 2A includes a plurality of text communication associated with a plurality of individuals (e.g., text data 210 may be an email conversation thread, a chat, a set of word documents having different authors, and the like), and is referred to one or more domain-specific terms, one or more names are selected from names of the plurality of individuals based on a frequency of using the one or more domain-specific terms within the plurality of text communications associated with the plurality of individuals. For example, if a domain-specific term GPS is used in communications associated with Roger Easton, Bradford Parkinson, and Ivan Getting, these individuals may be suggested to be listed for data field 443.

In certain instances, a KH backend, such as KH backend 170, may be configured to generate one or more template domain-specific term records. These template domain-specific term records are produced by analyzing text data through text frequency analysis, aiming to identify commonly used text patterns within the data. Such patterns may include frequently used abbreviations, acronyms, words, phrases, and similar elements. In one implementation, natural language processing models can be employed to scrutinize these patterns within the text. For instance, tools like Scikit-learn or RapidMiner are capable of extracting statistical information from text data, unveiling frequently used text patterns. In specific cases, a text pattern may consist of a single word, a group of words, or even a regular expression.

Such an analysis may be performed by detection component 172 of KH backend 170. Further, in some implementations, based on the identified frequently used text patterns, detection component 172 is configured to select one or more frequently used text patterns as being one or more selected domain-specific terms. Additionally, detection component 172 (or communication interface 171) is configured to allocate within a memory, one or more template domain-specific term records corresponding to the one or more selected domain-specific terms. In some cases, these template domain-specific term records may have blank fields for text description, links, list of people, and notes, but may have non-blank domain-specific term names (e.g., text strings representing the one or more selected domain-specific terms can be entered for a title data field).

In some cases, KH backend 170 may be configured to generate one or more domain-specific term records. Similar to the process of generating template domain-specific term records, detection component 172 may analyze text data to identify frequently used text patterns. As an illustration, detection component 172 may be configured to identify text patterns serving as domain-specific terms that a user frequently employs while inputting text data. Based on the recognized frequently used text patterns, the detection component 172 selects one or more patterns as the chosen domain-specific terms. Moreover, in some implementations, the detection component 172 is designed to interact with communication interface 171 to provide a user with a record-entering interface, allowing the user to input information for generating the identified domain-specific term records based on frequently used text patterns. Once the user enters and submits the information, the communication interface 171 is configured to generate the one or more domain-specific term records by allocating them within memory. These allocated records contain the information entered by the user.

In some cases, KH backend 170 may be configured to generate a domain-specific term record by using detection component 172 to analyze the text data to identify one or more predefined text patterns within the text data. For example, such predefined text patterns may include linguistic short forms, name of organizations, names of projects, and the like. For instance, when a linguistic short form is identified, based on this linguistic short form, detection component 172 may be configured to interact with communication interface 171 to present a user a record-entering interface for allowing a user to enter information for generating the domain-specific term record related to the identified linguistic short form. Once the user enters and submits the information, the communication interface 171 is configured to generate the domain-specific term record by allocating it within memory. This allocated record contains the information entered by the user.

As discussed above, in some implementations, detection component 172 may identify one or more target domain-specific terms within text data by analyzing text data through text frequency analysis. In other implementations, a pattern may be provided by a user, and domain-specific term may be identified within the text data that matches such a pattern. As an example, extension 154 may be configured to provide an interface for a user to enter a text pattern for identifying a new target domain-specific term within the text data. Extension 154 may be configured to transmit the entered text pattern to detection component 172. Detection component 172 may be configured to receive the text pattern, analyze the text data to identify the new target domain-specific term; and when the new target domain-specific term is identified within the text data, generate a new template target domain-specific term record. This involves allocating the new template target domain-specific term record within a memory, with the title name being designated as the newly identified target domain-specific term.

In some cases, the text pattern may include at least one of a text string, a regular expression, a token, a part-of speech identifier, a named entity recognition tag, or a combination thereof. Further, in some cases, the pattern includes a semantic role label, the semantic role label obtained by analyzing text data using a natural language processing model.

In some implementations, KH backend 170 may be configured to conduct a comprehensive scan of internal resources, such as the internal wiki and Jira system, with the aim of constructing an initial knowledge graph based on analysis of various documents. Alternatively, this gathered information can be incrementally utilized in the construction of the knowledge base (KH) by incorporating additional data pertaining to named entities within the organizational framework by, for example, providing possible suggestions to users when users enter information related to various domain-specific terms.

It should be noted that once a set of domain-specific terms is identified and domain-specific term records are created corresponding to the set of domain-specific terms, these domain-specific terms are simply identified within text data by scanning through the text data and matching at least one text pattern within the text data with one of the domain-specific terms from the set of domain-specific terms. In an example implementation the text pattern may be a text string, and domain-specific term is a word, such as a linguistic short form, a group of words, or a phrase.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
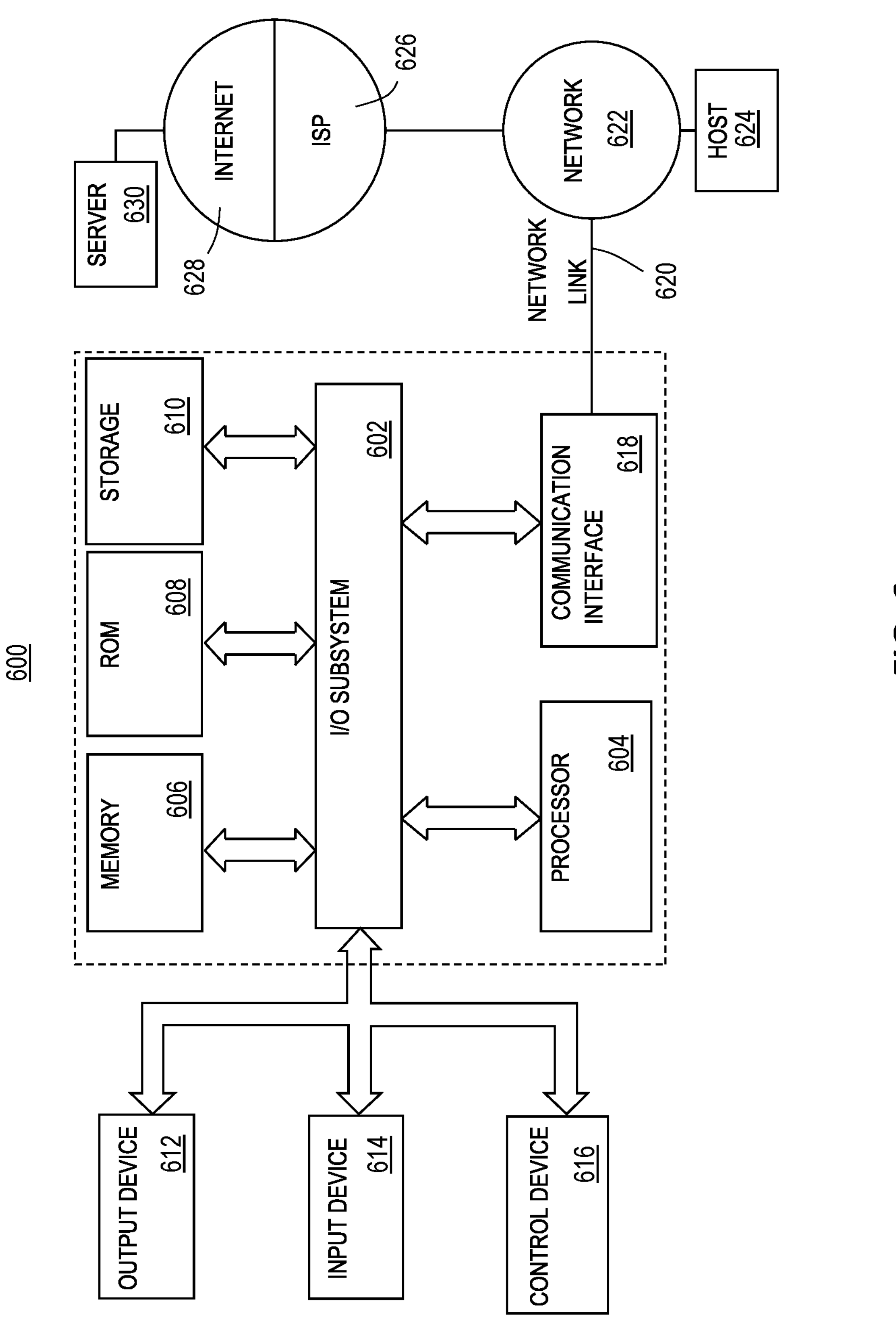
FIG. 6 is a computer system according to an embodiment.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for dynamically presenting information in digital documents, the computer-implemented method executed using a first computer and comprising:

receiving text data;

identifying in the text data a target domain-specific term based on a set of domain-specific term records, each domain-specific term record including a domain-specific term and a term description;

generating first presentation instructions which when rendered cause visually displaying at a second computer an interactive element corresponding to the target domain-specific term;

receiving a signal indicating a computer interaction with the interactive element;

accessing a target domain-specific term record from the set of domain-specific term records corresponding to the target domain-specific term, to retrieve a target term description comprising a term description for the target domain-specific term, in response to the signal; and generating second presentation instructions which when rendered cause visually displaying at the second computer the target term description using a domain-specific term associated knowledge card;

wherein the second presentation instructions, when rendered at the second computer, further cause displaying, using a graphical user interface (GUI) of the second computer, at least one of a list of user accounts associated with the domain-specific term, a list of links to data files associated with the domain-specific term, a list of actions that can be performed and defining a programmatic behavior of the knowledge card, or notes associated to the domain-specific term; and displaying in the GUI one or more controls programmed to receive input to edit at least one of a list of user accounts associated with the domain-specific term, a list of links to data files associated with the domain-specific term, a list of actions that can be performed and defining a programmatic behavior of the knowledge card, or notes associated to the domain-specific term.

2. The computer-implemented method of claim 1, wherein the target domain-specific term is one of a linguistic short form, a name of a product or service, an organization, an event, a task, a domain-specific construct, or a phrase containing natural language.

3. The computer-implemented method of claim 1, wherein providing the interactive element includes generating a link for a text string within the text data corresponding to the target domain-specific term.

4. The computer-implemented method of claim 1, wherein the signal comprises event data specifying that a click on a generated link occurred.

5. The computer-implemented method of claim 1, further comprising:

generating the first presentation instructions which when rendered at the second computer cause displaying an interface that is programmed for displaying one or more domain-specific terms associated with the text data and, in association with the one or more domain-specific terms, at least:

domain-specific term names;

term descriptions; and statistical information, the statistical information containing at least one of a number of times the one or more domain-specific terms are used, a number of hyperlinks associated with the one or more domain-specific terms, or a number of notes associated with the one or more domain-specific terms.

6. The computer-implemented method of claim 1, wherein the target domain-specific term record further includes at least one of a list of user accounts associated with the domain-specific term, a list of links to data files associated with the domain-specific term, a list of actions that can be performed and defining a programmatic behavior of the interactive element, notes associated to the domain-specific term, a type of the target domain-specific term record, or one or more matching patterns for identifying the target domain-specific term.

7. The computer-implemented method of claim 6, wherein the type of the target domain-specific term record is one of a project, a product, a team, an event, or a process.

8. The computer-implemented method of claim 1, further comprising:

receiving, from the second computer, input specifying a request for accessing an administration panel interface for editing the set of domain-specific term records;

generating third presentation instructions which when rendered at the second computer cause displaying an administration panel interface;

receiving, via the administration panel interface, instructions from the second computer specifying changing one or more domain-specific term records of the set of domain-specific term records; and executing the instructions and updating the one or more domain-specific term records of the set of domain-specific term records.

9. The computer-implemented method of claim 1, further comprising:

generating third presentation instructions which when rendered at the second computer cause displaying an interface with selection controls for selecting one or more text characters within the text data;

identifying a domain-specific term based on the selected one or more text characters;

generating fourth presentation instructions which when rendered at the second computer cause displaying a record-entering interface with record controls to enter information for generating a domain-specific term record related to an identified domain-specific term based on the identified domain-specific term; and generating a domain-specific term record by allocating within a memory of the first computer the domain-specific term record having the information.

10. The computer-implemented method of claim 9, wherein the record-entering interface is configured to suggest at least one of a link to data related to the identified domain-specific term or one or more names of user accounts associated with the information associated with the identified domain-specific term.

11. The computer-implemented method of claim 10, wherein the text data comprises a plurality of text communication associated with a plurality of user accounts, and wherein the one or more names are selected from names of the plurality of user accounts based on a frequency of using the identified domain-specific term within the plurality of text communication associated with the plurality of user accounts.

12. The computer-implemented method of claim 1, further comprising:

using a text frequency analysis, identifying frequently used text patterns within the text data;

based on the identified frequently used text patterns, selecting one or more frequently used text patterns; and allocating within a memory, one or more template domain-specific term records corresponding to one or more selected domain-specific terms that match the frequently used text patterns.

13. The computer-implemented method of claim 1, further comprising:

using a text frequency analysis, identifying frequently used text patterns within the text data;

generating third presentation instructions which when rendered at the second computer cause displaying a record-entering interface having controls programmed for receiving information for generating one or more domain-specific term records related to the identified frequently used text patterns; and generating the one or more domain-specific term records by allocating within a memory of the first computer the one or more domain-specific term records having the information.

14. The computer-implemented method of claim 1, further comprising:

analyzing the text data to identify a linguistic short form within the text data;

generating third presentation instructions which when rendered at the second computer cause displaying a record-entering interface with controls programmed for receiving information for generating the domain-specific term record related to the identified linguistic short form based on the identified linguistic short form; and generating the domain-specific term records by allocating within a memory the domain-specific term record having the information.

15. The computer-implemented method of claim 1, wherein identifying the target domain-specific term includes matching at least one text pattern within the text data with a domain-specific term from the set of domain-specific term records.

16. The computer-implemented method of claim 1, further comprising:

receiving a text pattern for identifying a new target domain-specific term within the text data;

analyzing the text data to identify the new target domain-specific term; and generating a new template target domain-specific term record by allocating within a memory the new template target domain-specific term record with a title name being the new target domain-specific term when the new target domain-specific term is identified within the text data.

17. The computer-implemented method of claim 16, wherein the text pattern comprises at least one of a text string, a regular expression, a token, a part-of speech identifier, a named entity recognition tag, combination thereof, or wherein the text pattern includes a semantic role label, the semantic role label obtained by analyzing text data using a natural language processing model.

18. A non-transitory machine-readable storage medium storing computer program code, execution of which in a first computer causes the first computer to perform a process comprising:

receiving text data;

identifying in the text data a target domain-specific term based on a set of domain-specific term records, each domain-specific term record including a domain-specific term and a term description;

generating first presentation instructions which when rendered cause visually displaying at a second computer an interactive element corresponding to the target domain-specific term;

receiving a signal indicating a computer interaction with the interactive element;

accessing a target domain-specific term record from the set of domain-specific term records corresponding to the target domain-specific term, to retrieve a target term description comprising a term description for the target domain-specific term, in response to the signal; and generating second presentation instructions which when rendered cause visually displaying at the second computer the target term description using a domain-specific term associated knowledge card;

wherein the second presentation instructions, when rendered at the second computer, further cause displaying, using a graphical user interface (GUI) of the second computer, at least one of a list of user accounts associated with the domain-specific term, a list of links to data files associated with the domain-specific term, a list of actions that can be performed and defining a programmatic behavior of the knowledge card, or notes associated to the domain-specific term; and displaying in the GUI one or more controls programmed to receive input to edit at least one of a list of user accounts associated with the domain-specific term, a list of links to data files associated with the domain-specific term, a list of actions that can be performed and defining a programmatic behavior of the knowledge card, or notes associated to the domain-specific term.

19. A first computer comprising:

a communication interface through which to communicate with a second computer via network; and at least one processor coupled to the communication interface and configured to perform a process that includes receiving text data;

identifying in the text data a target domain-specific term based on a set of domain-specific term records, each domain-specific term record including a domain-specific term and a term description;

generating first presentation instructions which when rendered cause visually displaying at the second computer an interactive element corresponding to the target domain-specific term;

receiving a signal indicating a computer interaction with the interactive element;

accessing a target domain-specific term record from the set of domain-specific term records corresponding to the target domain-specific term, to retrieve a target term description comprising a term description for the target domain-specific term, in response to the signal; and generating second presentation instructions which when rendered cause visually displaying at the second computer the target term description using a domain-specific term associated knowledge card;

wherein the second presentation instructions, when rendered at the second computer, further cause displaying, using a graphical user interface (GUI) of the second computer, at least one of a list of user accounts associated with the domain-specific term, a list of links to data files associated with the domain-specific term, a list of actions that can be performed and defining a programmatic behavior of the knowledge card, or notes associated to the domain-specific term; and displaying in the GUI one or more controls programmed to receive input to edit at least one of a list of user accounts associated with the domain-specific term, a list of links to data files associated with the domain-specific term, a list of actions that can be performed and defining a programmatic behavior of the knowledge card, or notes associated to the domain-specific term.

* * * * *